O. W. GRIMES.
MACHINE FOR SCUTCHING AND HACKING HEMP.
No. 8,374. Patented Sept. 23, 1851.
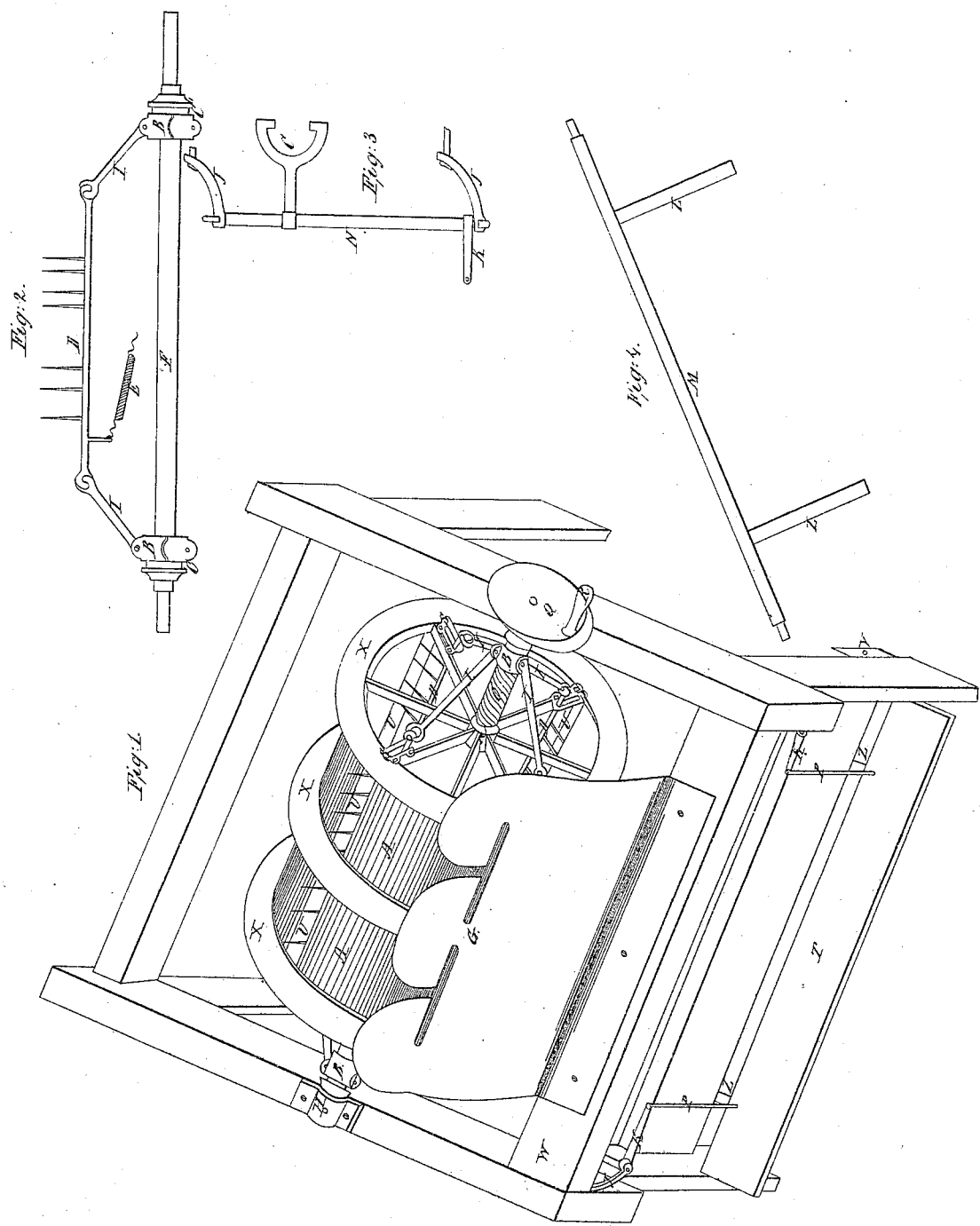

UNITED STATES PATENT OFFICE.

OWEN W. GRIMES, OF PADUCAH, KENTUCKY.

IMPROVEMENT IN MACHINES FOR SCUTCHING AND HACKLING HEMP AND FLAX.

Specification forming part of Letters Patent No. 8,374, dated September 23, 1851.

*To all whom it may concern:*

Be it known that I, OWEN W. GRIMES, of Paducah, in the county of McCracken and State of Kentucky, have invented certain new and useful Improvements in the Machine for Scutching and Hackling Hemp; and I do hereby declare the following to be a full, clear, and exact description of the same, reference being had to the accompanying drawings, making part of the same, in which—

Figure 1 represents an isometrical view, and Figs. 2, 3, and 4 detached parts of the machine not distinctly shown in Fig. 1.

Similar letters in the several figures denote the same parts.

The nature of my invention consists in the manner of throwing the teeth in and out of the drum with which they revolve to any desired distance while the machine is in operation, so as to give more or less hold on the hemp or other material, or drawing them entirely within the drum when the material becomes entangled and liable to choke or break up the machine; and, also, the method of allowing the teeth, when out, to fall back or yield sufficiently far to allow the material to slip over them when too great a strain is suddenly brought upon them, and recovering their proper position again after passing said obstruction.

To enable others skilled in the art to make and use my invention, I will proceed to describe the same with reference to the drawings.

On a frame of any suitable construction I place the necessary bearings, H, Fig. 1, for supporting the spindles of the shaft F, Fig. 2, and upon said shaft I arrange the collars B B, which are loose and move freely on said shaft when operated by the treadle, to be hereinafter described. Near the spindles of the shaft at each end are flanges on said shaft, against which the collars B B are forced and rest by the spiral spring O, Fig. 1, which is coiled around the shaft, one end of said spiral spring bearing against the hub *a* of the drum A, the other end bearing against the collar B, which keeps said collar in place. The collars are connected by the rods I and bars D, (better seen in Fig. 2,) of which there may be four, or any other number, and on the bar D is arranged the teeth for scutching and hackling the hemp, of which there may be also any suitable number. When the collars B are drawn toward the center of the shaft, or toward the drum, the teeth project through the slots U, and just in proportion as the collars are moved in or out so will the teeth project more or less.

The drum may be made of wood or metal, and rotates with the shaft, said drum having flanges or rims upon its periphery (marked X) to keep the hemp straight and prevent it from entangling, and at each end are arranged guides S, through which the bars D, carrying the teeth, may freely move underneath the shell of the drum and opposite the slots U.

In front of the machine is a shield, G, which is so formed as to allow the hemp to drop down and spread in a horizontal slot, (represented at Fig. 1,) so as to present it evenly to the teeth as they rotate, and for protection to the operator.

T is a treadle upon which the operator places his foot, said treadle being hung on a bar, M, Fig. 4, which has its bearings in the bottom of the front legs of the machine, and partially seen at V, Fig. 1, so that it may freely move when any weight is placed upon it. The treadle rests upon the arms L L of the bar M. Attached to the ends of the treadle are the rods P P′, their upper ends being hinged to the levers K, which are in turn attached to the bar N, upon which is firmly attached the yoke C, which fits into the grooves C′ at each end of the collars, so that by pressing upon the treadle the collars are drawn toward each other, throwing out the teeth to any required distance.

The guides S S may be made to give the teeth any inclination toward or from the operator. When the points of the teeth are thrown from him, the machine hugs the hemp more closely around the drum, and when thrown toward him the hemp plays more upon the point of the teeth and hugs less closely to the drum, and thereby throws the tow more readily from the machine, and in that manner cleans itself of the tow; and if this should fail to clear the machine of the tow the operator can clear it entirely by removing his foot from the treadle T, and letting the teeth fly into the drum by means of the elongation of the spiral spring O, which forces back the collars on the shaft.

In the inside of the drum there is a small spiral spring, E, attached by one end to an arm upon the bar D, and by the other end to the inside of the shell of the drum, for the purpose of keeping said bar and the teeth upon it in proper position, and drawing them back whenever they are thrown toward the operator by the knots or tangled places in the hemp, thereby preventing the teeth from being broken, or from breaking the fibers of the hemp, or pulling the hemp out of the hands of the operator.

Having thus fully described my invention, what I claim therein as new, and desire to secure by Letters Patent, is—

1. The method herein described, or any other means essentially the same, of throwing the teeth in and out of the cylinder or drum at pleasure while in motion, so as to present a greater or less length of teeth to the hemp, or of drawing them entirely within the cylinder in case the hemp should become entangled and likely to break up the machine.

2. In combination with the bar holding the teeth, the spiral spring for allowing said bar to yield to knots or other obstructions, and for drawing back into proper position the said bar after it is released from said obstruction.

3. In combination with the bar and teeth, arranged as herein described, the adjustable guides S, for setting the teeth at such angle as will give them more or less hold upon the hemp, as herein fully described and represented.

OWEN W. GRIMES.

Witnesses:
R. B. J. TUYMAN,
S. B. FROST.